United States Patent [19]

Boden et al.

[11] 4,398,773
[45] Aug. 16, 1983

[54] MAGNETIC SUSPENSION ASSEMBLY FOR A ROTOR

[75] Inventors: Karl Boden, Jülich; Johan K. Fremerey, Bonn, both of Fed. Rep. of Germany

[73] Assignee: Kernforschungsanlage Jülich Gesellschaft mit beschrankter Haftung, Jülich, Fed. Rep. of Germany

[21] Appl. No.: 148,236

[22] Filed: May 9, 1980

[30] Foreign Application Priority Data

May 12, 1979 [DE] Fed. Rep. of Germany ....... 2919236

[51] Int. Cl.³ ............................................. F16C 39/00
[52] U.S. Cl. ............................................. 308/10
[58] Field of Search ............... 308/10; 290/43, 52, 290/54; 324/173, 174

[56] References Cited

U.S. PATENT DOCUMENTS

| | | | |
|---|---|---|---|
| 3,143,704 | 8/1964 | Wright | 308/10 |
| 3,233,950 | 2/1966 | Baermann | 308/10 |
| 3,243,238 | 3/1966 | Lyman | 308/10 |
| 3,493,275 | 2/1970 | Stone | 308/10 |
| 3,512,851 | 5/1970 | Love | 308/10 |
| 3,623,835 | 11/1971 | Boyd | 308/10 |
| 3,698,775 | 10/1972 | Gilber | 308/10 |
| 3,791,704 | 12/1974 | Perper | 308/10 |
| 3,877,761 | 4/1975 | Boden | 308/10 |
| 3,888,553 | 6/1975 | Wehde | 308/10 |
| 3,890,019 | 6/1975 | Boden | 308/10 |
| 3,929,390 | 12/1979 | Simpson | 308/10 |
| 4,037,886 | 7/1977 | Boden | 308/10 |
| 4,043,614 | 8/1977 | Lyman | 308/10 |
| 4,065,189 | 12/1977 | Sikorra | 308/10 |
| 4,080,012 | 3/1978 | Boden | 308/10 |

FOREIGN PATENT DOCUMENTS

| | | | |
|---|---|---|---|
| 1472413 | 1/1969 | Fed. Rep. of Germany | 308/10 |
| 2341766 | 2/1975 | Fed. Rep. of Germany | 308/10 |
| 2342767 | 3/1975 | Fed. Rep. of Germany | 308/10 |
| 2504631 | 8/1975 | Fed. Rep. of Germany | 308/10 |
| 2309754 | 5/1976 | France | 308/10 |

OTHER PUBLICATIONS

Siemens Data Book; 1976/77; "Galvanometric Devices", Munich, Germany; pp. 51–92.
Machine Design 1963, vol. 35, Mar. 14, pp. 14–15.

Primary Examiner—R. Skudy
Attorney, Agent, or Firm—Karl F. Ross; Herbert Dubno

[57] ABSTRACT

A magnetic suspension system, especially for a rotor, comprises a stator having two axially spaced permanent magnets which are poled the same as a pair of spaced-apart permanent magnets on the rotor so that a repulsion field suspends the rotor within the stator. A magnetic coil surrounds the rotor and is disposed between the pole pieces of the stator substantially bridging the gap between them and the permanent magnets of the stator and the rotor repel each other in the axial direction. A contactless field sensor responds to the axial position of the rotor and controls the energization of the magnetic coil to stabilize the axial position of the rotor by augmenting or decreasing the net axial forces generated by the magnetic fields in the axial direction.

8 Claims, 5 Drawing Figures

MAGNETIC SUSPENSION ASSEMBLY FOR A ROTOR

FIELD OF THE INVENTION

Our present invention relates to a magnetic suspension or bearing assembly for a rotor and, more particularly, to a magnetic suspension for a rotor which is provided with means for stabilizing the axial position of the rotor.

BACKGROUND OF THE INVENTION

In magnetic bearings or suspensins for rotors or shafts, the rotor is generally maintained in a contactless state relative to the stator by magnetic field forces which are kept in balance.

For example, in German patent document (Open Application-Offenlegungsschrift) DE-OS No. 14 72 413, a magnetic suspension arrangement for an upright shaft is disclosed in which two annular permanent magnets are provided for the radial stabilization of the rotor on the latter and confront two annular permanent magnets of the stator with opposite polarity. The axial stabilization is provided by a disk formed on the end of the shaft of ferromagnetic material and a cup-shaped magnet on the stator juxtaposed with this disk. The latter magnet is energized electrically under the control of field plates which are disposed between the disk and the cup-shaped magnet and which operate through a circuit for controlling coil energization for maintaining the axial position substantially constant.

This system has the disadvantage that the cup-shaped magnet and the associated disk take up space which could be more usefully exploited otherwise and make the entire assembly bulky and difficult to incorporate into an apparatus in which the magnetic suspension would otherwise be advantageous.

Reference may also be made to the following patent documents which are relevant to magnetic suspension bearings and assemblies: German patent No. DE-OS No. 23 41 766 and U.S. Pat. Nos. 3,243,238, 3,888,553 and 3,512,851.

For an explanation of the operation of magnetic field plates as magnetic field sensors, and the associated circuitry, reference may be had to *Siemens Data Book* 1976/1977 *Galvanomagnetic Devices,* Siemens AG, Munich Germany, p. 51 ff., in which the field plates are referred to as magneto resistors.

It is also known to provide a magnetic suspension which has at each end of the shaft two annular ferromagnetic bodies which are spaced apart.

In the region of the ferromagnetic bodies, the stator is provided with two annular permanent magnets between which an annular controllable electromagnetic element is provided with a ferromagnetic core. While the electromagnetic element combination with the ferromagnetic body of the rotor and the permanent magnets effects a radial stabilization, this system cannot be effectively used for axial stabilization except through detecting the axial rotor position and controlling the magnetic field of a further annular electromagnet which varies and stabilizes the magnetic forces acting in the axial direction. This suspension is capable of balancing forces but not moments and for complete suspension or journaling, still a second suspension element is required.

The other magnetic suspensions of the aforementioned patent documents, while being capable of maintaining a rotor in suspension, have various disadvantages including large size, complex construction and inability to be provided in an extremely reliable and compact configuration.

OBJECTS OF THE INVENTION

It is, therefore, the principal object of this invention to provide an improved magnetic suspension for a rotor which is free from the disadvantages of the prior art systems and which has a simple construction, is compact and of an especially low volume and which is capable of providing both radial and axial stabilization of a rotor.

Yet another object of this invention is to provide an improved magnetic suspension, especially adapted for passive radial stabilization and active controlled axial stabilization, which can be fabricated at low cost and can be utilized with a variety of machines for various applications.

SUMMARY OF THE INVENTION

These objects and others which will become apparent hereinafter are attained, in accordance with the present invention, in a magnetic suspension for a rotor and which comprises a pair of axially spaced pole pieces formed on the stator and each having at least one magnetic pole turned toward said rotor, a pair of pole pieces on the rotor with a corresponding axial spacing, the pole pieces all forming permanent magnets and the number of poles of each pole pieces of the stator being the same as the number of the juxtaposed corresponding pole piece of the rotor which is radially spaced therefrom, and the poles are so oriented that repulsion forces are maintained between the juxtaposed pole pieces of the rotor and stator in the radial direction.

In addition, an electromagnetic coil is provided and cooperates with the permanent magnets to generate an axial-position-stabilizing field which is varied in response to movement of the rotor in the axial direction, the coil being energized in response to a position signal detected by a contactless sensor of the axial position of the rotor via an appropriate circuit.

Magnetic coil completely or practically bridges the gap between the stator pole pieces and the permanent magnets of the stator on the one hand are poled to repel each other magnetically while the permanent magnets of the rotor on the other hand are poled to repel each other. Thus the permanent magnets of the stator and those of the rotor are repellantly magnetized in the axial direction.

This magnetic suspension bearing system has the advantage that the permanent magnets of the stator and rotor provide a passive stable balance in the radial direction while the intrinsically unstable equilibrium in the axial direction is stabilized by active control of the magnetic coil.

Thus, as soon as the rotor tends to be thrown out of equilibrium in the axial direction and the fields of the permanent magnet act to accelerate this displacement, the correspondingly energized magnetic coil, in response to the detected axial displacement, produces an oppositely effective stabilizing magnetic field. With any tendency toward axial displacement in one or the other direction, therefore, the system automatically produces a countervailing magnetic force tending to bring the rotor back into its original position. The stabilizing axial forces are phase-shifted timewise relative to the axial shift so that, in addition to the restoring force, damping forces are applied to stabilize retention of the rotor in its original position.

In order to increase the axial force field of the energized magnetic coil, a ferromagnetic body can be disposed between the permanent magnets of the rotor.

It has also been found to be advantageous to extract the oscillation energy of the rotor in the radial direction by providing ahead of at least one end of the rotor a damping element mounted on the stator of relatively high electric conductivity, an electric conductivity higher than that of the permanent magnet, to function as a sort of eddy current brake.

Furthermore, the permanent magnets can each be provided with pole shoes of soft iron to make their magnetic fields at least in the region of the pole pieces, substantially uniform.

The magnetic suspension of the present invention can be utilized with great advantage for devices, instruments or the like, in which the rotor is supported in a contactless manner with respect to the stator but nevertheless is subjected to axial forces.

For example, it can be used in a rotation counter for a turbine which is driven by liquids or gases and is mounted on a tube traversed by the gases or liquids which drive the turbine so that the speed of the latter reflects the flow rate and the total rotation count reflects the volume traversing tube.

In this case, the tubular housing is provided with two axially spaced annular permanent magnets bridged by a coil surrounding the tube and filling the space between the two circular permanent magnets of the stator.

Within this housing the rotor, formed with blades or vanes, is provided at its ends with two permanent magnets respectively spaced by the pole spacing of the stator. Between the permanent magnets of the rotor, a ferromagnetic body is provided and the rotor is formed with a signal generator whose output is picked up by a receiver on the housing so that the two form a motion-/electrical transducer.

While it is known to provide vaned or turbine rotors in tubular housings for such purposes heretofore, so that each rotation corresponds to a given throughout and the speed to a given flow velocity, especially for liquids although gas flow rates can also be measured by such turbines utilizing an inductive pickup from the rotor, the rotor is generally journaled in a bearing system disposed in the tube.

Obviously, such bearing systems interfere with the flow parameters, are subjected to wear and otherwise have disadvantages resulting from contamination or the like of moving parts. When the measured fluid is a corrosive medium, moreover, the bearing parts must be formed from a corrosion-resistant system at relatively high cost.

With the system described above in accordance with the present invention, however, the coil, the stator magnets and the pickup can all be located externally of the tube and completely out of the path of the measured fluid. Nevertheless the system provides both passive radial stabilization and active axial stabilization which is effective independently of flow rate fluctuations since all axial forces applied by the gas to the rotor can be balanced by the magnetic field contribution of the coil. There is absolutely no bearing friction so that the measurement precision is high, wear is eliminated and contamination of bearing surfaces completely excluded. Furthermore, since the tubular housing can be completely sealed, the system may be used for measuring the flows of environmentally hazardous materials without danger.

The axial stabilization is maintained even when the flow direction is reversed.

A turbine wheel flow measuring device according to the invention has been found to be especially effective for breathing device enabling both inhaled and exhaled air flow to be measured.

The flowmeter also can be used effectively for an anesthetic administration, in disinfective devices and wherever gases or liquids must be metered in a fully sanitary and accurate manner.

The energization current for the magnetic coil can be produced in a simple manner by measuring the axial displacement of the rotor with a contactless position detector and converting a position signal to a corresponding control signal in a control circuit which can be a comparator establishing the set point position of the rotor.

We have found that best results are obtained with inductive measuring methods whereby at each end of the rotor a metal ring can be provided while the housing or stator is formed with two coils connected to the control circuit. The magnetic elements can be applied in various ways to the rotor. For example, the rotor can be formed as a hollow shaft in which the ferromagnetic body and the two permanent magnets are disposed. The ferromagnetic body and the two permanent magnets may be constituted as solid or hollow elements, e.g. as sleeves.

The magnetic suspension device of the present invention can also be used as the bearing for an electrical power metering system having a vertical rotor shaft. By comparison with earlier magnetic suspension systems, it has small height, fewer parts and simpler mounting. In addition the meter disk after assembly can be easily repositioned or adjusted during operation.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
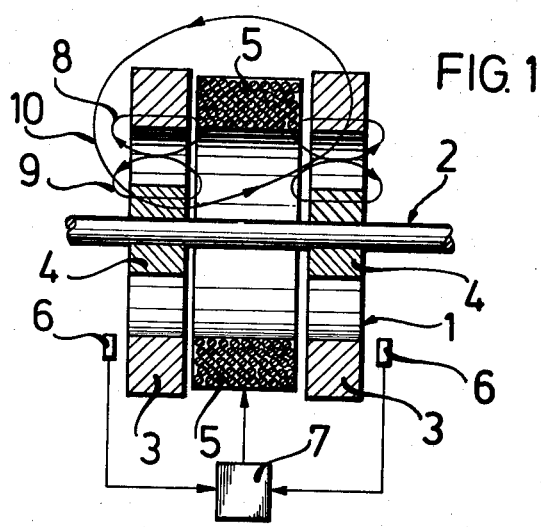
FIG. 1 is a diagrammatic view, in axial cross section, of a magnetic suspension system according to the invention.

The magnetic suspension system shown diagrammatically in FIG. 1 comprises a stationary stator 1 in which a rotor 2 is suspended for coaxial rotation by magnetic forces in a contactless manner.

The stator 1 is provided with two circular permanent magnets 3 which are coaxial with each other and are spaced by an axial distance bridged completely or substantially completely by a coil 5 coaxial with the rotor and with these permanent magnets.

Two annular or sleeve-like permanent magnets 4 are mounted on the rotor 2 at the same distance, i.e. each is juxtaposed with one of the permanent magnets 3.

The rotor 2 is shown as a simple shaft for convenience, although it will be generally coupled to a working mechanism as will be described in connection with FIGS. 4 and 5, or of any of the devices previously described. In addition, the coil 5 may be mounted upon a coil carrier surrounding the shaft 2 or simply separated therefrom by an air space.

The permanent magnets are magnetized so that in the axial direction the field component 8 of the permanent magnets 3 and the field component 9 of the permanent magnets 4 are oppositely oriented so that the permanent magnets of the rotor are thus magnetized in mutual repulsion and the permanent magnets of the stator have corresponding parts magnetized in mutual repulsion.

Between the paired permanent magnets 3, 4 at each end, the field components 8, 9 run axially outwardly for each pair.

With energization of the magnetic coil 5, a controlled magnetic field is superimposed upon the passive fields of the four permanent magnets, the active field 10 adding to the coaxial field components 9 of the rotor or subtracting therefrom.

In FIG. 1, for example, the field component contributed by the coil 5 adds to the field component 9 of the left magnet 4 and subtracts from the field component from the right electromagnet. Obviously a reversal of the current flow through the coil 5 superimpose the field component 10 on the passive fields in the opposite direction.

According to the invention, means is provided for the contactless sensing of the position of the rotor 2 and controlling the current through the coil 5 to regulate the superimposed field 10 as a function of this measurement.

Figure 2:
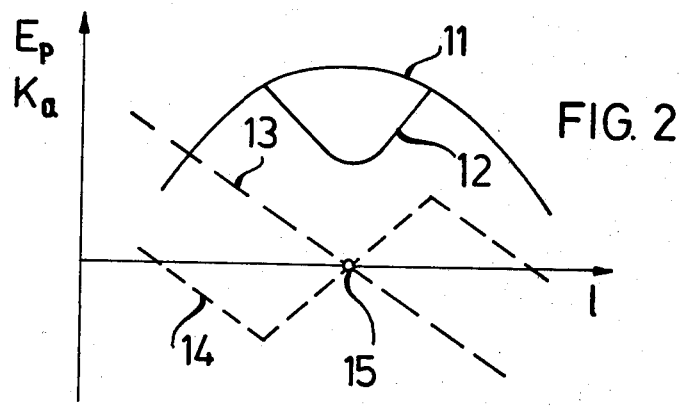
FIG. 2 is a graph plotting the potential energy and magnetic force generated in the axial direction along the ordinate against the axial displacement of the rotor along the abscissa.

Contactless position detection can utilize any type of transducer, e.g. an inductive, galvanomagnetic, capacitive or optic sensor. In FIG. 1 the sensor shown schematically as two field plates (magneto resistors) are provided to respond to the change in magnetic fields associated with movement of the rotor, straddle the stator and provide their inputs to a control circuit 7 varying the current flow in direction in the coil 5 (see *Galvanomagnetic Devices*, op cit.). FIG. 2 shows the curve 11 of the potential energy $E_p$ of the rotor as a function of the axial displacement 1 of the rotor with respect to its original or set point position. This potential energy drops from its maximum value at the set point position with movement to either side so that the axial force $K_a$ which results from the effect of the permanent magnets corresponds to the curve 13, i.e. increases with increasing distance from the set point 15, thereby accelerating the displacement of the rotor.

When, however, the magnetic coil 5 is energized as a function of the axial displacement, the potential energy follows the curve 12, i.e. with increasing displacement from the set point position, the potential energy first rises and then falls.

Curve 14, associated with the use of the coil 5, shows that the axial force inversely tends to draw the rotor 2 back to its zero position until the maximum potential energy peaks are reached.

This control circuit 7 converts axial displacement of the rotor from the proportional change in resistance of the magneto resistors 6 into voltages which are amplified and processed in an electronic phase-shifting network to control the power supply to the coil 5 and determine the direction of polarity of this current and hence the current flow direction to the coil depending upon the direction in which the rotor displacement occurs. The magnetic field contribution 10 of the coil increases with increasing displacement.

The phase-shifting network 7 results in a delay in the response of the opposing force to an axial displacement of the rotor so that the restoring force also functions as a damping force preventing untoward oscillation of the rotor in the axial direction.

The energy of the coil 5 depending upon direction and with variable current amplitude thus maintains the axial position of the rotor within a predetermined tolerance to either side of the set point position 15.

Figure 3:
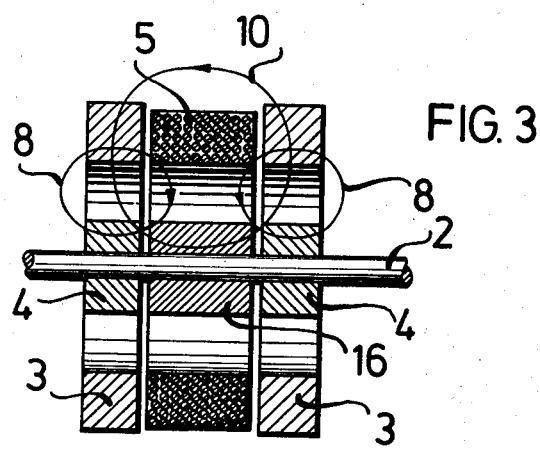
FIG. 3 is a view similar to FIG. 1 illustrating another embodiment of the invention.

FIG. 3 shows an embodiment of the invention in which the rotor 2 is provided with an annular or sleeve-shaped ferromagnetic body 16 which regulates the field path of the coil 5 and strengthens the field generated thereby. For the sake of simplicity in FIG. 3, the field lines of permanent magnets 4 have not been shown.

Figure 4:
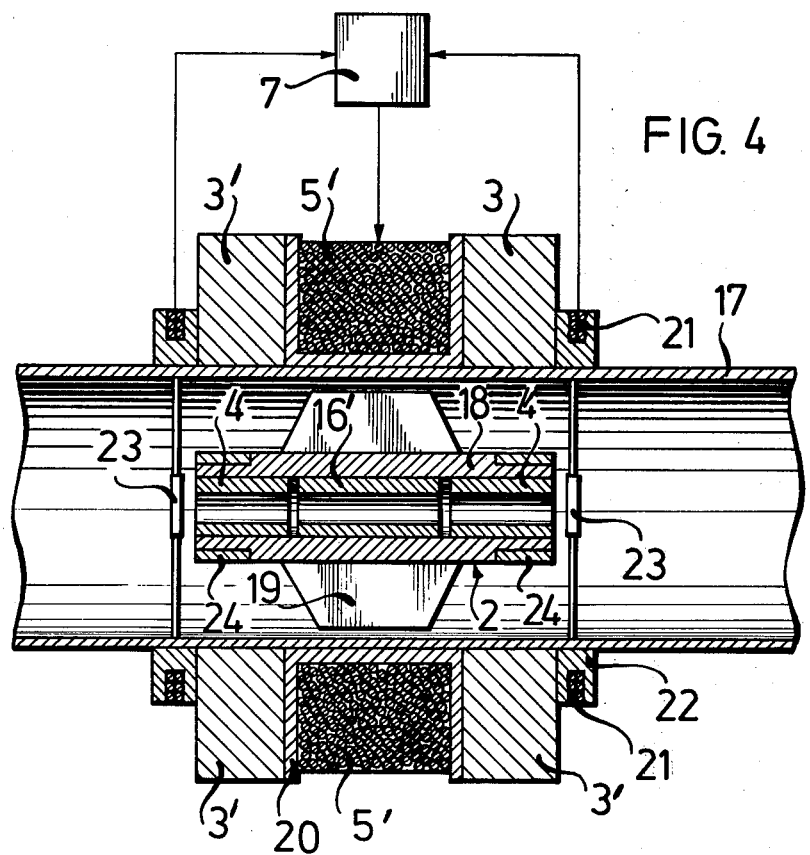
FIG. 4 is an axial cross-section view, also in diagrammatic form, showing a flow-monitoring device embodying the principles of the present invention.

FIG. 4 shows a turbine-type flow meter which comprises a tubular housing 17 in which the rotor 2', provided with vanes 19 is disposed for rotation in a contactless and coaxial manner. The rotor and housing are provided with a contactless rotation counter, e.g. a pulse former on the rotor and an inductive pulse detector on the housing, which have not been shown and which directly indicate the volume rate of low and velocity of the medium traversing the tubular housing 17. The tubular housing 17 can be provided at its ends with conventional flanges or connectors for placing the flow meter in any desired pipeline.

The tubular housing 17 is composed of a nonmagnetic material with low electrical conductivity, e.g. glass, which is also resistant to attack by the metered fluid and which hermetically seals the flow passage from the environment. No leakage can occur through any fittings in the wall of the tube since none are provided.

The rotor 2' comprises a hollow shaft 18 which is formed with the vanes 19 and which is thus rotated as the liquid or gas flows past the rotor, the vanes being canted to the direction of flow. In the hollow shaft 18 there is provided centrally a ferromagnetic sleeve 16' and at each end a respective permanent magnet sleeve 4'. The sleeves 4' and 16' are the functional equivalent to the permanent magnets 4 and field-concentrating sleeve 16 previously described. A slight air gap is maintained between each of the permanent magnets 4' and the ferromagnetic sleeve 16' or the space between them is filled with an electrical insulator.

On the exterior of the tube 17, there are provided two circular permanent magnets 3' between which the electrically energizable coil 5' is mounted, the coil being provided with a coil carrier or coil former 20.

The permanent magnets 3' and the coil 5' are the functional equivalents of the permanent magnets 3 and coil 5 previously described.

The permanent magnets 3' are here juxtaposed with the permanent magnets 4' of the rotor 2' while the coil 5' surrounds the ferromagnetic sleeve 16'.

The permanent magnets are composed of conventional high coercive force materials such as barium, ferrite, samarium cobalt magnetic materials and the magnetic fields of the permanent magnets correspond to those described in FIG. 1. The device operates however as described in connection with FIG. 3.

To provide a magnetic force balance for the rotor to oppose the force tending to drive the rotor in the direction of flow of the liquid or gaseous medium, the axial displacement of the rotor 2' is measured and the electrical current flow to the coil 5' is controlled accordingly.

For this purpose, each end of the rotor 2' is provided with a metal ring 24, e.g. of aluminum while the housing 17 is formed with a pair of coil carriers 22 receiving respective sensing coils 21.

Upon axial displacement of the rotor 2, an inductive field change is detected by the coils 21 and is applied to the control circuit 7. Obviously other contactless measuring devices such as galvanomagnetic capacitive or optical devices can be used. Particular mention should be made of the field plates similar to those of FIGS. 1 and 5 or Hall-effect generators.

In the manner previously described, circuit 7 controls the current traversing the coil 5' to balance magnetically the axial force tending to displace the rotor in the direction of fluid flow.

To draw off radial oscillation energy from the rotor 2', damping elements 23 in the form of electrically conductive metal plates or disks can be mounted ahead of each of the rotor 2', the damping elements 23 being shown to be mounted by arms on the inner wall of the tube 17.

Figure 5:
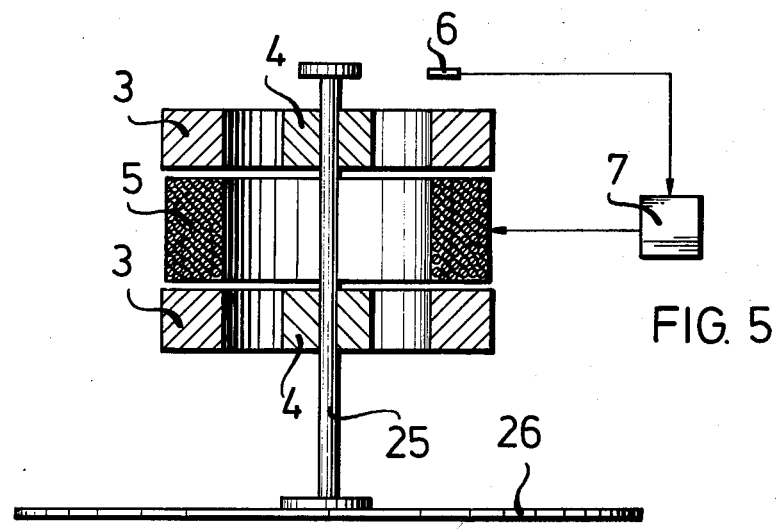
FIG. 5 is an axial cross-sectional view in diagrammatic form showing the principles of the present invention as applied to the elastic suspension of a rotor for an electric meter.

FIG. 5 shows an embodiment which is functionally equivalent to that of FIG. 1 but is applied to the journalling of a vertical or erect shaft in an electrical meter, the disk 26 of which may be the conventional induction disk. This system can be used in any Watt-hour meter.

We claim:
1. A magnetic suspension system comprising:
a stator formed with two stator permanent magnets spaced apart along an axis and an annular coil disposed between said stator permanent magnets and substantially completely bridging the gap between them;
a rotor surrounded by said stator permanent magnets and said coil and rotatable relative to said stator about said axis and out of contact with said stator, said rotor being provided with two rotor permanent magnets axially spaced corresponding to the spacing between the stator permanent magnets and each respectively paired with a stator permanent magnet and poled in mutual repulsion, the stator permanent magnets being in mutual axial magnetic repulsion, and the rotor permanent magnets being magnetically poled in axial repulsion;
detecting means for the contactless detection of axial shifting of said rotor relative to said stator;
circuit means responsive to said detecting means for energizing said coil to superimpose an active magnetic field on the fields of said permanent magnets and restore said rotor to a set point position by magnetic axial force, said stator being formed with a tubular housing and the stator permanent magnets being mounted on said housing along the exterior thereof, said coil surrounding said housing, said rotor being formed with vanes whereby rotation of the rotor signals fluid flow parameters of a fluid traversing said housing.
2. The system defined in claim 1 wherein a respective metal ring is provided at each end of said rotor and said detecting means includes a pair of coils mounted on said housing and responsive to movement of said metal rings.
3. A magnetic suspension system comprising:
a stator formed with two stator permanent magnets spaced apart along an axis and an annular coil disposed between said stator permanent magnets and substantially completely bridging the gap between them;
a rotor surrounded by said stator permanent magnets and said coil and rotatable relative to said stator about said axis and out of contact with said stator, said rotor being provided with two rotor permanent magnets axially spaced corresponding to the spacing between the stator permanent magnets and each respectively paired with a stator permanent magnet and poled in mutual repulsion, the stator permanent magnets being in mutual axial magnetic repulsion, and the rotor permanent magnets being magnetically poled in axial repulsion;
detection means for the contactless detection of axial shifting of said rotor relative to said stator;
circuit means responsive to said detecting means for energizing said coil to superimpose an active magnetic field on the fields of said permanent magnets and restore said rotor to a set point position by magnetic axial force, said stator being formed with a tubular housing and the stator permanent magnets being mounted on said housing along the exterior thereof, said coil surrounding said housing, said rotor being formed with vanes whereby rotation of the rotor signals fluid flow parameters of a fluid traversing said housing, a respective metal ring being provided at each end of said rotor and said detecting means including a pair of coils mounted on said housing and responsive to movement of said metal rings, said rotor being formed with a hollow shaft and said rotor permanent magnets being received in said shaft; and
a ferromagnetic sleeve received in said shaft and spaced from the rotor permanent magnets.
4. The system defined in claim 3 wherein the rotor permanent magnets are formed as sleeves.
5. A magnetic suspension system comprising:
a stator formed with two stator permanent magnets spaced apart along an axis and an annular coil disposed between said stator permanent magnets and substantially completely bridging the gap between them;
a rotor surrounded by said stator permanent magnets and said coil and rotatable relative to said stator about said axis and out of contact with said stator, said rotor being provided with two rotor permanent magnets axially spaced corresponding to the spacing between the stator permanent magnets and each respectively paired with a stator permanent magnet and poled in mutual repulsion, the stator permanent magnets being in mutual axial magnetic repulsion, and the rotor permanent magnets being magnetically poled in axial repulsion;
detection means for the contactless detection of axial shifting of said rotor relative to said stator;
circuit means responsive to said detecting means for energizing said coil to superimpose an active magnetic field on the fields of said permanent magnets and restore said rotor to a set point position by magnetic axial force.

6. The system defined in clam 1, further comprising a ferromagnetic body disposed between said rotor permanent magnets.

7. The system defined in claim 1, further comprising a damping element juxtaposed with at least one of the ends of said rotor and composed of a material having a high electrical conductivity.

8. The system defined in claim 1 or claim 2 wherein said rotor is formed with an erect shaft of an electric power meter.

* * * * *